United States Patent
Leon

(10) Patent No.: US 8,264,338 B2
(45) Date of Patent: Sep. 11, 2012

(54) CONTROL KNOB ASSEMBLY, SYSTEM AND CONTROL METHOD

(75) Inventor: Jeff M. Leon, Arcadia, CA (US)

(73) Assignee: Honda Motor Co., Ltd., Tokyo (JP)

( * ) Notice: Subject to any disclaimer, the term of this patent is extended or adjusted under 35 U.S.C. 154(b) by 511 days.

(21) Appl. No.: 12/533,683

(22) Filed: Jul. 31, 2009

(65) Prior Publication Data

US 2011/0025488 A1    Feb. 3, 2011

(51) Int. Cl.
*B60Q 1/00* (2006.01)
(52) U.S. Cl. ......................................... 340/456; 340/461
(58) Field of Classification Search .................. 340/456, 340/459, 461; 200/61.88, 61.91; 701/36, 701/51
See application file for complete search history.

(56) References Cited

U.S. PATENT DOCUMENTS

| | | | |
|---|---|---|---|
| 5,884,528 A | 3/1999 | Ludanek et al. | |
| 6,201,471 B1 * | 3/2001 | Jones | 340/461 |
| 6,500,092 B2 | 12/2002 | Syamoto | |
| 6,564,661 B2 | 5/2003 | DeJonge | |
| 6,661,114 B2 | 12/2003 | Syamoto | |
| 2006/0037424 A1 | 2/2006 | Pickering et al. | |
| 2009/0271080 A1 * | 10/2009 | Pickering et al. | 701/51 |

FOREIGN PATENT DOCUMENTS

JP        2002-301946        10/2002

* cited by examiner

*Primary Examiner* — John A Tweel, Jr.
(74) *Attorney, Agent, or Firm* — Rankin Hill & Clark LLP

(57) ABSTRACT

A combination shifter and engine start apparatus for a vehicle includes a control knob rotatable to a plurality of positions to instruct operation of an associated transmission of the vehicle and actuatable for at least one of starting and stopping of an associated engine of the vehicle. A display is disposed on the control knob for alternately displaying first indicia on the control knob relating to at least one of starting and stopping of the associated engine and displaying second indicia on the control knob relating to a selected one of the plurality of positions. A controller is operatively connected to the control knob and to the display. The controller has a first mode wherein the controller commands the display to display the first indicia and a second mode wherein the controller commands the display to display the second indicia.

21 Claims, 6 Drawing Sheets

CONTROL KNOB ASSEMBLY, SYSTEM AND CONTROL METHOD

BACKGROUND

The present disclosure generally relates to a control knob assembly, and more particularly relates to a combination shifter and engine start apparatus for a vehicle.

Modern vehicles are plagued with a large amount of switch gear (i.e., controls, etc.). Such switch gear controls various systems of the vehicle, such as the navigation system, the HVAC system, the audio system, etc., and other functions of the vehicle, such as selecting a gear (e.g., park, neutral, reverse, drive, etc.) of a transmission, starting/stopping of the vehicle's engine, etc. Due to the ever increasing number of controls and switches provided in vehicles, organization becomes a challenge and ease of use can be hindered.

One known rotary shift knob is provided in Jaguar's 2009 XF vehicle. In particular, this vehicle uses a rotary control knob to shift its automatic transmission. Starting of the engine in this vehicle occurs through a separately disposed start button. One known Mercedes Benz vehicle combines a shifter control and start button. In particular, this vehicle provides a shifter lever having a start button disposed thereon. Unfortunately, the room needed for packaging this arrangement is still significant and the start/stop button is always visible, even when the engine is started and the vehicle is moving. In another known shifter, an LCD display is provided that displays a gear selection on the knob itself. No starter functionality is provided in combination with this shifter. In still another Mercedes Benz vehicle (i.e., the SLR McLaren), a start button is hidden in a shifter knob. In particular, the start button is hidden under a flap that is flipped up when access to the start button is desired.

BRIEF DESCRIPTION

According to one aspect, a combination shifter and engine start apparatus is provided for a vehicle. More particularly, in accordance with this aspect, the combination shifter and engine start apparatus includes a control knob, a display and a controller. The control knob is rotatable to a plurality of positions to instruct operation of an associated transmission of the vehicle and is actuatable for at least one of starting and stopping of an associated engine of the vehicle. The display is disposed on the control knob for alternately displaying first indicia on the control knob relating to at least one of starting and stopping of the associated engine and displaying second indicia on the control knob relating to a selected one of the plurality of positions. The controller is operatively connected to the control knob and to the display. The controller has a first mode wherein the controller commands the display to display the first indicia relating to the at least one of starting and stopping of the associated engine and a second mode wherein the controller commands the display to display the second indicia relating to the selected one of the plurality of positions.

According to another aspect, a control method is provided for a combination shifter and engine operation apparatus in a vehicle. In the method, a rotary control knob is provided that is rotatable to a plurality of positions for instructing operation of the transmission of the vehicle and actuatable for at least one of starting and stopping of an engine of the vehicle. The control knob includes a display disposed thereon. First indicia are displayed on the display relating to at least one of starting and stopping of the engine. Second indicia are displayed on the display relating to a selected one of the plurality of positions at which the rotary control knob resides.

According to still another aspect, a control knob assembly is provided for a vehicle. More particularly, in accordance with this aspect, the control knob assembly includes a rotary control knob rotatable to a plurality of positions for commanding a first vehicle function of a vehicle and is separately actuatable through touch input on an upper face thereof for actuating a second vehicle function. A display is disposed on the upper face where the touch input is received. First indicia are displayed on the display relating to the first vehicle function and second indicia are displayed on the display relating to the second vehicle function.

DETAILED DESCRIPTION

Figure 1:
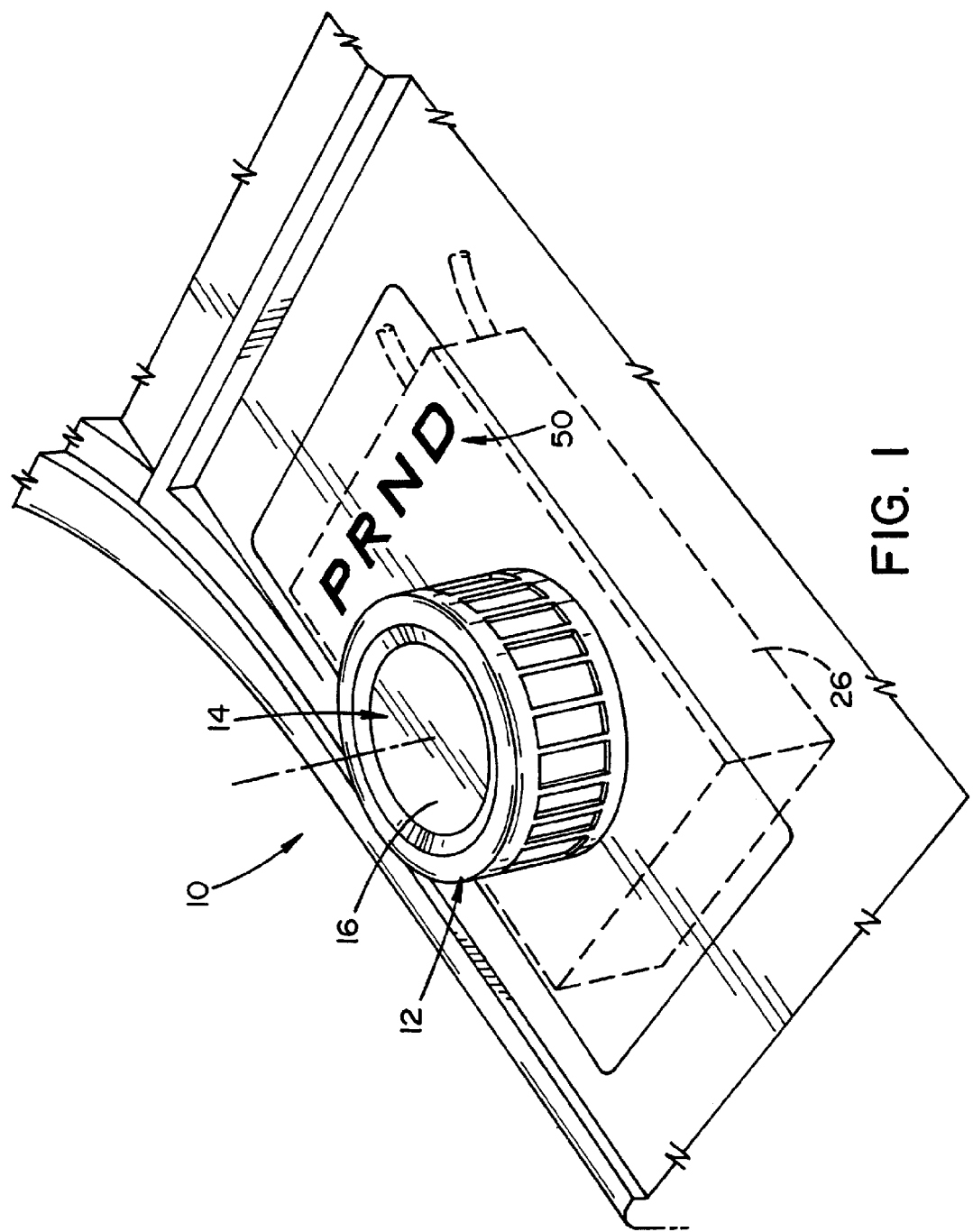
FIG. 1 is a perspective view of a combination shifter and engine start apparatus for a vehicle.

Referring now the drawings, wherein the showings are only for purposes of illustrating one or more exemplary embodiments and not for limiting same, FIG. 1 shows a control knob assembly 10 for a vehicle including a rotary control knob 12 rotatable to a plurality of positions for commanding a first vehicle function of the vehicle and separately actuatable through touch input on an upper face 14 thereof for actuating a second vehicle function. A display 16 is provided or disposed on the upper face 14 where the touch input for actuating a second vehicle function is received. As will be described in more detail below, first indicia (e.g., first indicia 18 of FIG. 2 relating to starting and stopping of an associated engine of the vehicle) is displayed on the display 16 relating to the first vehicle function and second indicia (e.g., second indicia 20 of FIGS. 3-6 relating to a selected one of the plurality of positions) is displayed on the display 16 relating to the second vehicle function. In the embodiments described herein, the first vehicle function relates to the operation of a transmission 22 (FIG. 7) of the vehicle and the second vehicle function relates to at least one of starting or stopping of an engine 24 (FIG. 7) of the vehicle. Of course, however, as will be appreciated by those skilled in the art, the first and second vehicle functions could relate to other functions of the vehicle (e.g., HVAC functions, audio functions, etc.).

The depicted control knob assembly 10 provides a combination shifter and engine start apparatus for a vehicle. Accordingly, the control knob 12 is rotatable to a plurality of positions to instruct operation of the transmission 22 of the vehicle and actuatable for at least one of starting and stopping of the engine 24 of the vehicle. In this embodiment, the display 16 disposed on the control knob 12 is provided for alternately displaying the first indicia 18 relating to at least starting and stopping of the engine 24 or the second indicia 20 relating to a selected one of the control knob positions. The display 16 can be an LCD display screen or some other type of display capable of displaying the first and second indicia 18,20. The control knob assembly 10 can additionally include a second display or display area 50 disposed adjacent the control knob 12 for displaying third indicia (e.g., a backlit gear indicator as shown in FIGS. 3-6), which can also relate to a selected one of the plurality of positions of the control knob 12.

In one embodiment, the control knob 12 is displaceable as a button to actuate starting and stopping of the engine 24. For example, the display 16 can be formed as part of a vertically displaceable button which can be depressed when actuation is desired. In another embodiment, the display 16 can be a touch screen display that is receptive to touch input and thus actuation occurs simply by a user touching the display 16. Alternatively, the control knob 12, through the display 16, can be actuated by proximate movement where a user places a finger or other object in near contact with the display 16 to actuate the control knob 12.

Figure 7:
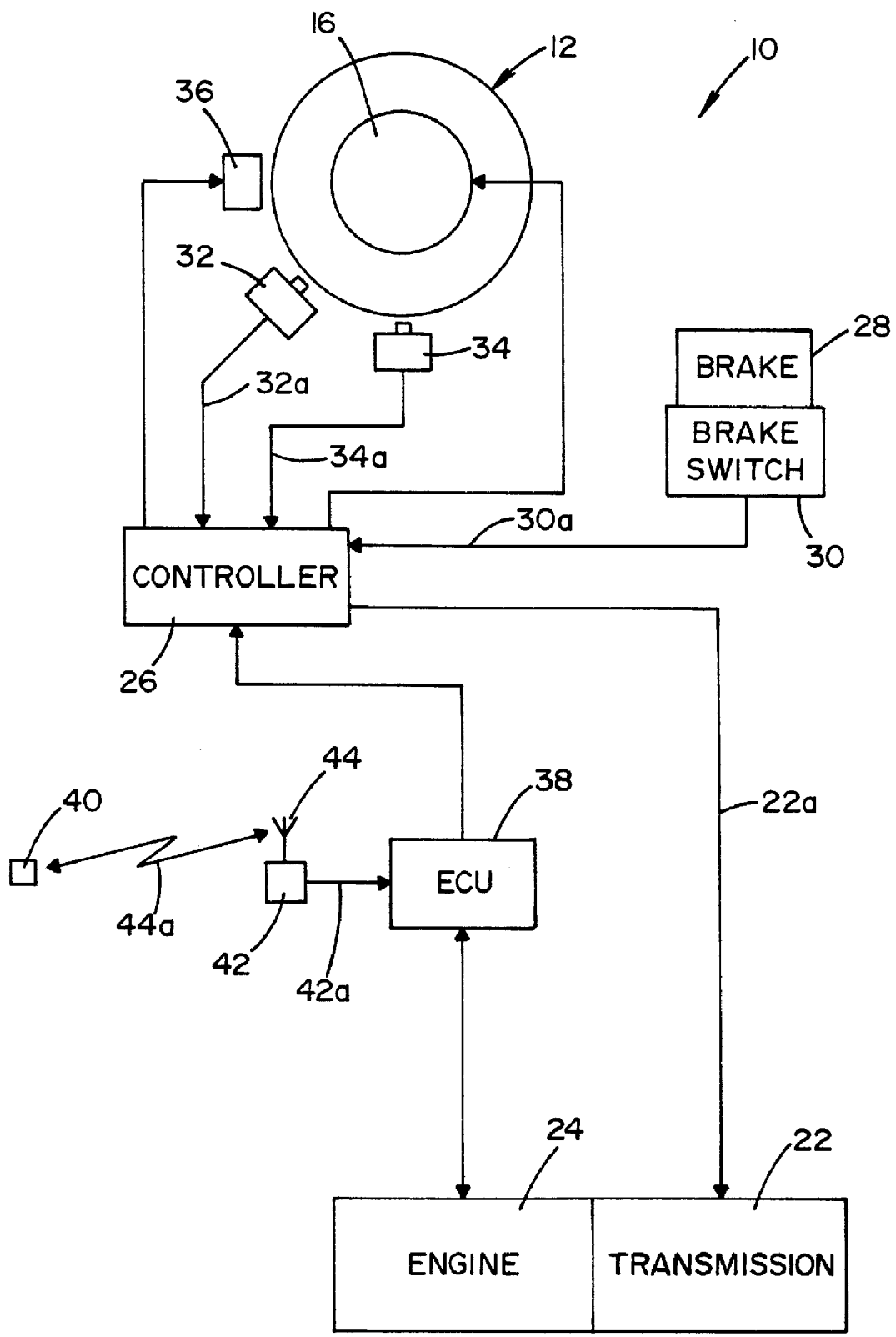
FIG. 7 is a schematic system diagram showing a controller operatively connected to the control knob and the display.

With additional reference to FIG. 7, the control knob assembly 10 depicted as a combination shifter and engine start apparatus further includes a controller 26 operatively connected to the control knob 12 and to the display 16. As will be described in more detail below, the controller 26 has a first mode wherein the controller 26 commands the display 16 to display the first indicia 18 relating to at least one of starting and stopping of the engine 24 and a second mode wherein the controller 26 commands the display 16 to display the second indicia 20 relating to the selected one of the positions. In addition, the controller 26 can have a third mode (shown in FIG. 1) wherein the controller 26 commands the display 16 to a non-display state (i.e., nothing is displayed on the display 16 and/or the display 16 is in a black-out state).

The control knob assembly 10 can further include a brake switch 30 operatively connected to the controller 26 for indicating a status of an associated brake 28 of the vehicle. In particular, the brake switch 30 can send a brake signal 30a indicating an ON or OFF state of brake 28 of the vehicle. As shown schematically, the controller 26 can also be operatively connected to a rotational signal generator 32 for receiving rotational signals 32a therefrom. Accordingly, the rotational signal generator 32 detects relative rotation of the rotary control knob 12 and generates rotational signals 32a corresponding thereto. The signals 32a are sent to and received by the controller 26. The controller 26 can also be operatively connected to a second signal generator 34 for receiving signals 34a therefrom when the control knob 12, and particularly the display 16, is actuated for starting or stopping of the engine 24. For example, when the control knob 12 is displaceable as a button, the signal generator 34 detects such vertical displacement and generates the corresponding signal or signals 34a, such signal or signals 34a being sent to and received by the controller 26. Alternatively, if the control knob 12 is actuated through only touch input, such as the display 16 being configured as a touch screen display, the signal generator 34 can detect touch input on the display 16 and generate corresponding signal 34a for the controller 26.

The control knob assembly 10 can further include a locking device 36 that selectively prevents rotation of the control knob 12. The locking device 36 is operatively connected to the controller 26 for control thereof. For example, the locking device 36 can prevent rotation of the control knob 12 when a signal 36a is sent to the locking device 36 from the controller 26. As will be described in more detail below, the locking device 36 can prevent rotation of the control knob 12, particularly from a park position, which is one of the plurality of positions, to any other of the plurality of positions when the engine 24 is ON as indicated by an electronic control unit (ECU) 38 unless the brake switch 30 indicates via signal 30a that the brake is ON.

In the embodiment schematically illustrated in FIG. 7, the controller 26 is shown separate from the ECU 38. In this configuration, the controller 26 can communicate with the ECU 38. For example, the ECU 38 can indicate to the controller 26, such as through a signal, when the engine 24 is ON or OFF. In addition, the ECU 38 can indicate to the controller 26, such as through another signal, when a portable or ignition device 40, which can be a key fob, is in the vicinity of the vehicle. More particularly, a receiver 42 having an antenna 44 can communicate and/or exchange signals 44a with the portable device 40 (i.e., in one or two directions). For example, the receiver 42 can generate a signal 42a, which can be referred to as an ignition signal, that is directed to the ECU 38 for confirming the presence of the portable device 40 within a predetermined area or vicinity of the vehicle. Alternatively, or in addition, the portable device 40 could be received in a port or receptacle provided in the vehicle (e.g., the portable device could be a key or fob received in a corresponding slot) and its physical presence in the slot could be detected and confirmed to the ECU 38.

In addition the controller 26 can send command signals 22a to the transmission 22 based on the position to which the rotary control knob 12 is rotated. Accordingly, the controller 26 can command the transmission 22 to be in a selected one gear of a plurality of gears corresponding to a rotary position of the control knob 12 (e.g., park, reverse, neutral, drive, etc.). Alternatively, though not shown, the controller 26 and ECU 38 can be integrated into a single controller. Also, if desired, a separate transmission controller can be provided for operating the transmission 22 in accordance with gear command signals 22a from the controller 26.

In operation, the controller 26 can be in the third mode (illustrated in FIG. 1) wherein the controller 26 commands the display 16 to a non-display state while the portable device 40 is outside the vicinity or predetermined area of the vehicle where nothing is displayed on the display 16. The third mode is continued until presence of the portable device 40 corresponding to the vehicle is confirmed, such as through receiver 42 and ECU 38. However, when the portable device 40 corresponding to the vehicle is confirmed to be in the vicinity or predetermined area of the vehicle, the controller 26 will always be in either the first mode (FIG. 2) or the second mode (FIGS. 3-6). The controller is in the first mode when the engine 24 is off, as confirmed by the ECU 38. The controller is also in the first mode when both the engine 24 is ON as confirmed by the ECU 38 and the brake switch 30 indicates via signal 30a that the associated brake is off (and the transmission is in park). Otherwise, the controller is in the second mode. By this arrangement, the controller 26 is prevented from entering the second mode when the engine 24 is off.

Figure 2:
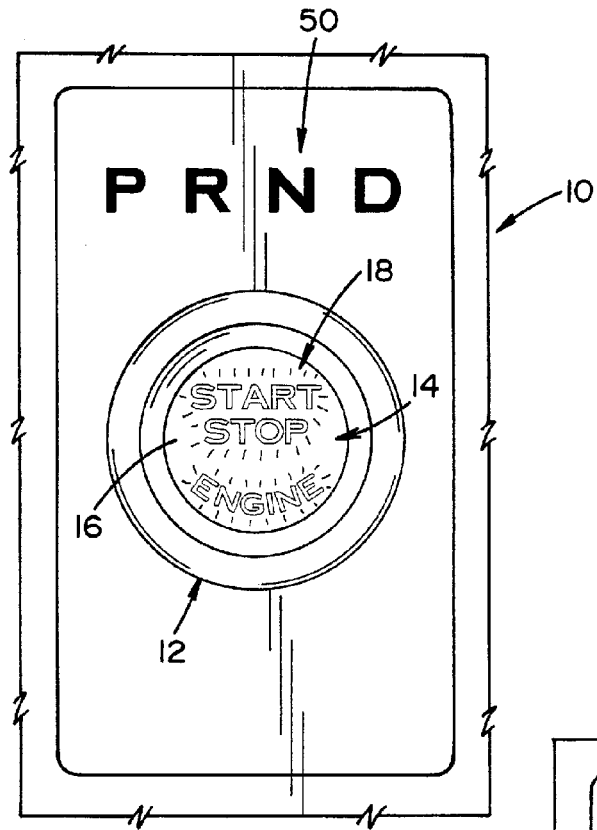
FIG. 2 is a schematic plan view of the combination shifter and engine start apparatus shown with a display displaying first indicia on a rotary control knob relating to starting and stopping of an engine of the vehicle.
Figure 3:
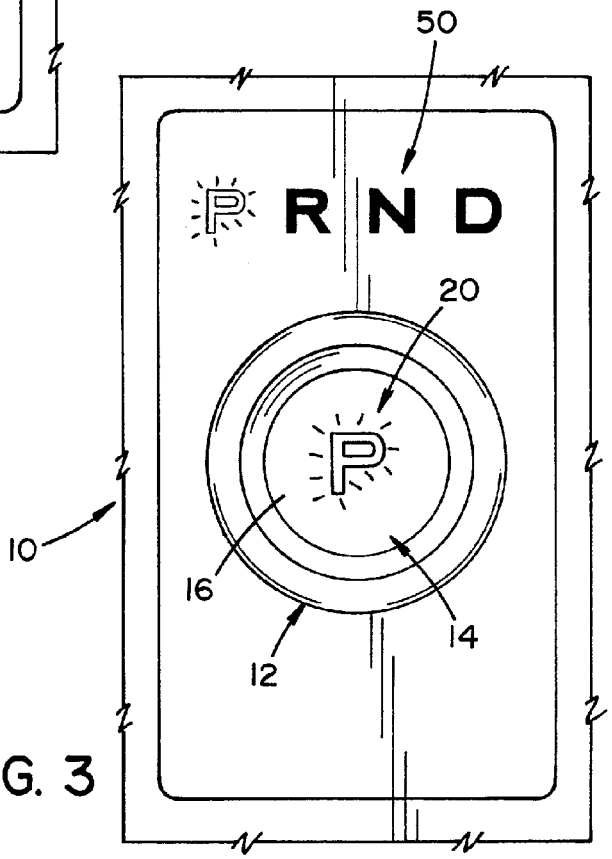
FIG. 3 is a schematic plan view of the combination shifter and engine start apparatus shown with the display displaying second indicia on the control knob relating to a selected one of a plurality of positions (i.e., park) to which the rotary control knob is rotatable.
Figure 4:
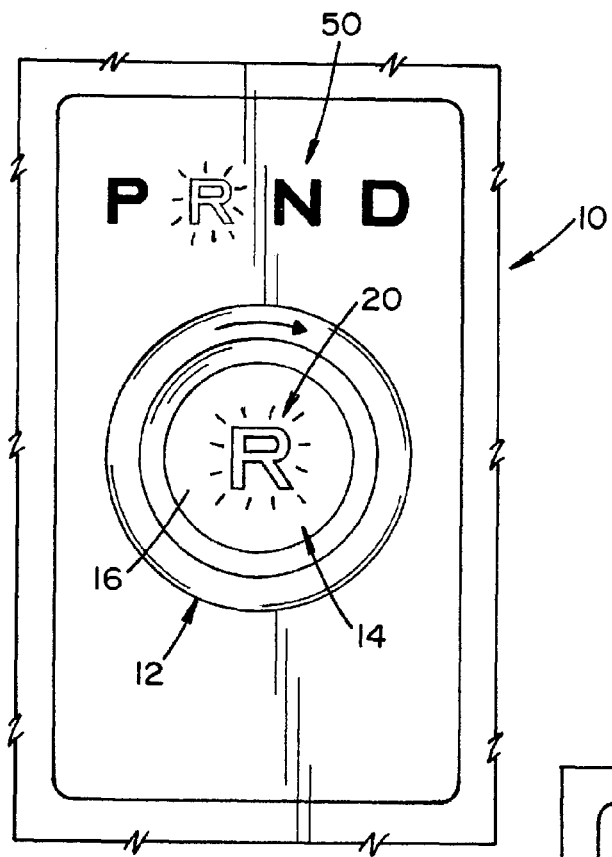
FIG. 4 is another schematic plan view of the combination shifter and engine start apparatus shown with the display displaying second indicia on the control knob relating to another selected one of the plurality of positions (i.e., reverse).
Figure 5:
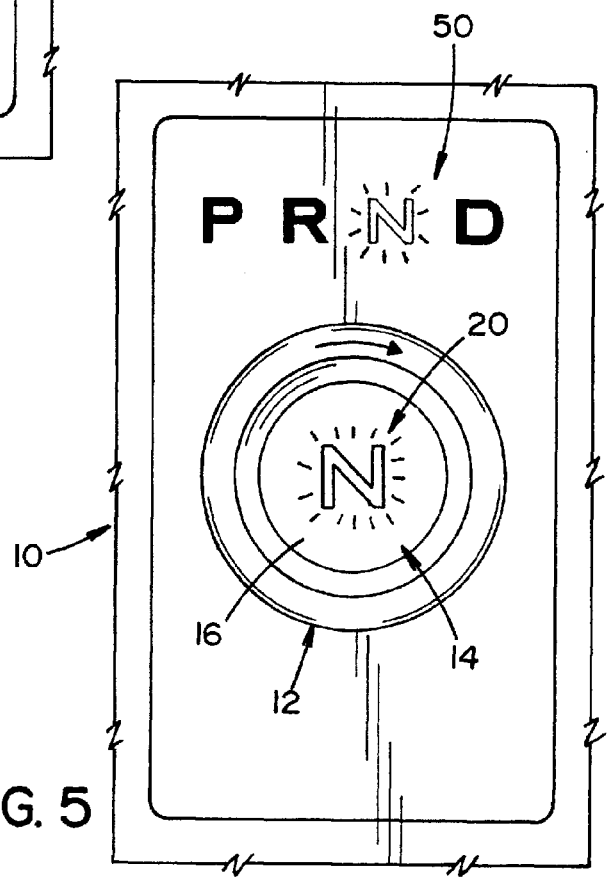
FIG. 5 is still another schematic plan view of the combination shifter and engine start apparatus shown with the display displaying second indicia on the control knob relating to still another selected one of the plurality of positions (i.e., neutral).
Figure 6:
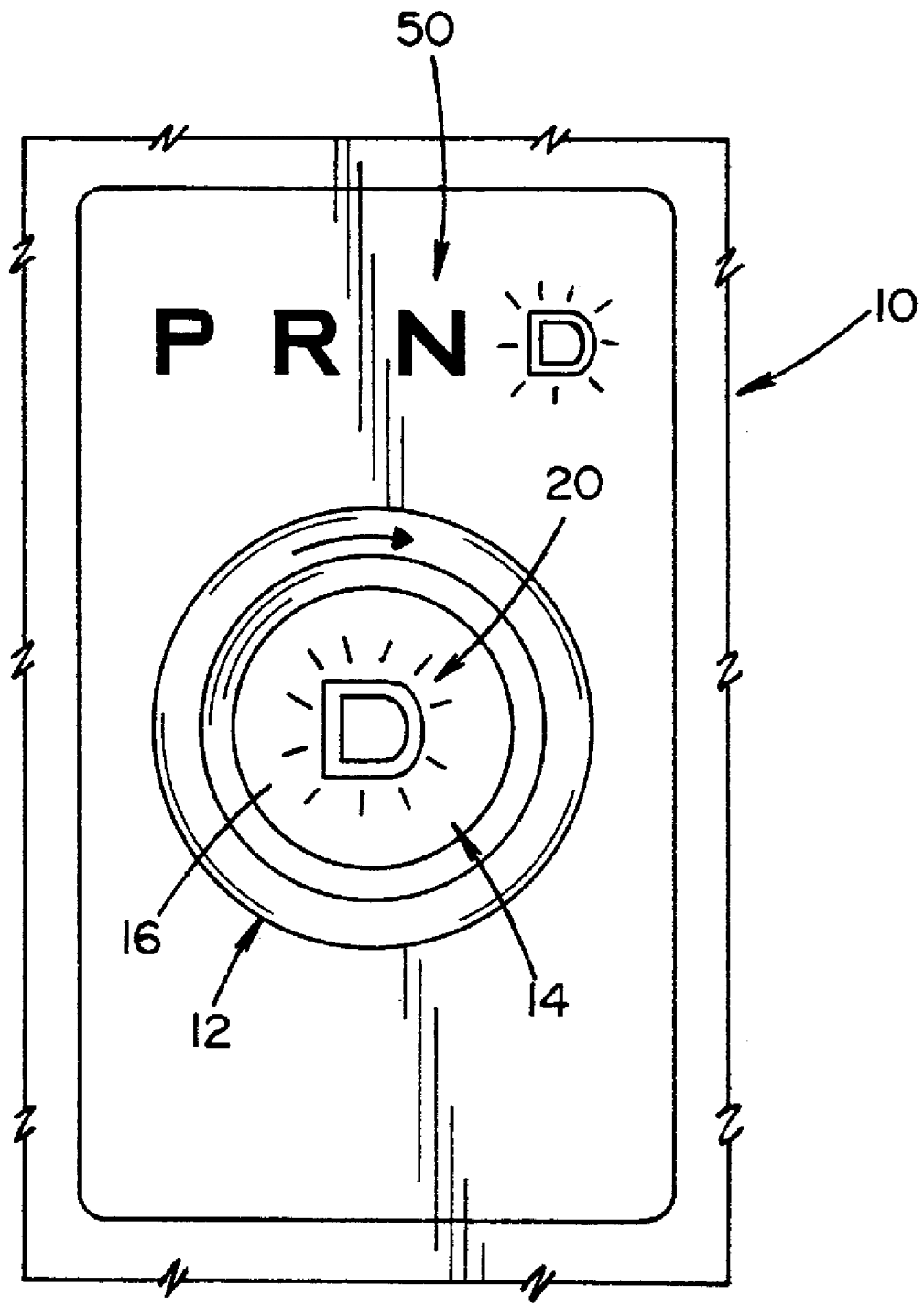
FIG. 6 is still yet another schematic plan view of the combination shifter and engine start apparatus showing the display disposed on the control knob displaying the second indicia related to another selected one of the plurality of positions (i.e., drive).
Figure 8:
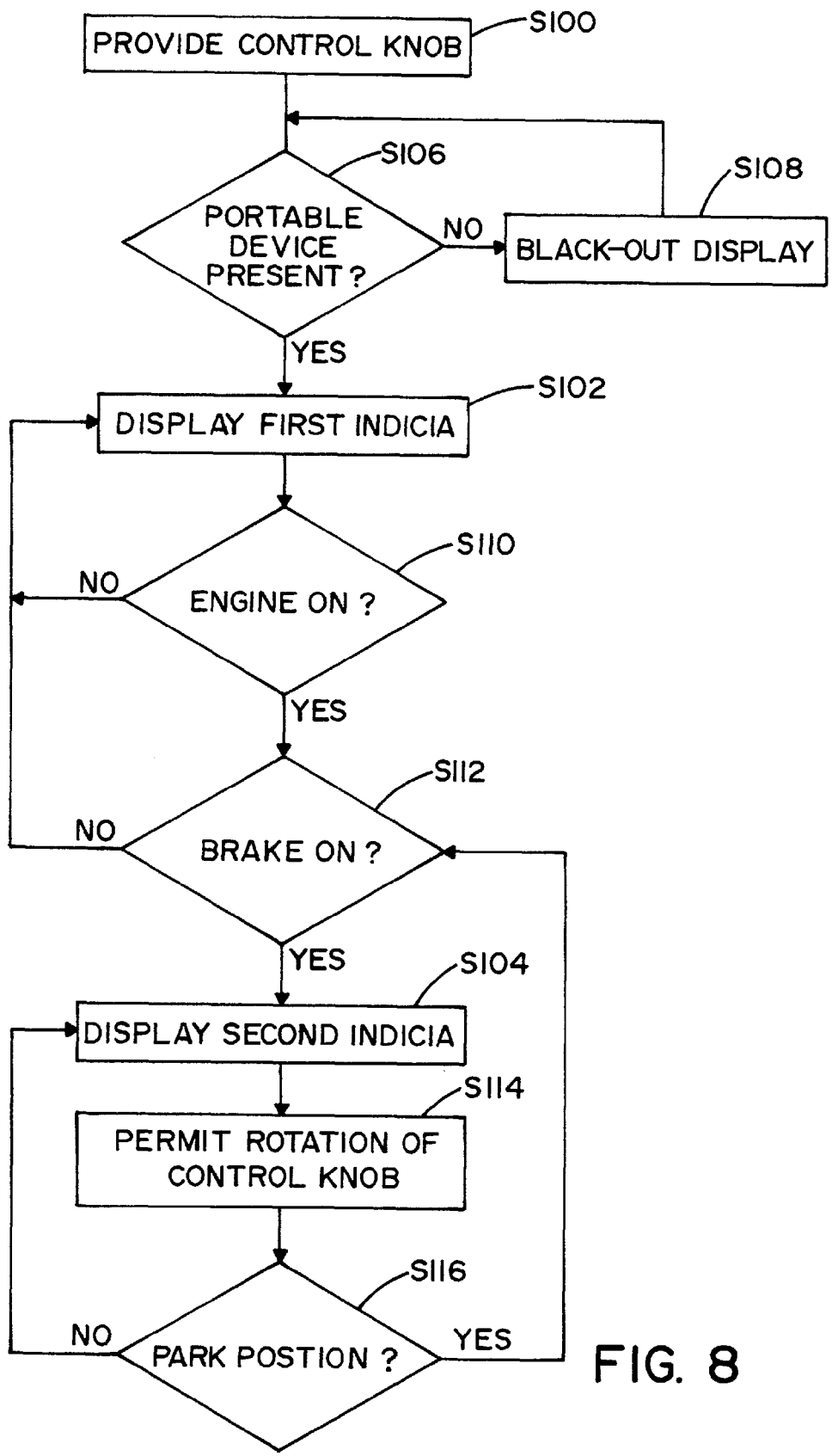
FIG. 8 is a process flow diagram illustrating a control method for the combination shifter and engine start apparatus.

With reference to FIG. 8, a control method for a combination shifter and engine operation apparatus in a vehicle, such as the control knob assembly 10 shown in FIGS. 1-7 and described in reference thereto, will now be described. In the method, rotary control knob 12, which is rotatable to a plurality of positions for instructing operation of transmission 22 of the vehicle and actuatable for at least one of starting and stopping of the engine 24, is provided (S100). As already described herein, the control knob 12 includes the display 16 disposed thereon which can display a first indicia, such as indicia 18, relating to at least one of starting and stopping of the engine 24. In the illustrated embodiment, the first indicia 18 of FIG. 2 are displayed on the display 16 and relate to both starting and stopping of the engine 24 (S102). A second indicia, such as indicia 20 relating to a selected one of the plurality of positions at which the rotary control knob 12 resides, can be displayed on the display 16 (S104).

More particularly, the method begins by detecting whether a portable device 40 is present (S106). As already described, this can include an ECU 38 receiving a signal, such as an ignition signal 42*a*, that indicates the presence of an ignition device, such as a portable device 40. The ECU 38 can communicate with the controller 26 such that the controller 26 is apprised of the presence of the portable device 40. When no portable device 40 is present at S106, the controller operates the display 16 so as to black-out the display (S108). Accordingly, neither the first indicia 18 or the second indicia 20 is displayed on the display 16 except when an ignition signal 42*a* indicates the presence of an ignition device, such as the portable device 40.

Provided the portable device is determined to be present at S106, the first indicia 18 relating to starting and stopping of the engine 24 is displayed at S102. One exemplary display of first indicia 18 is illustrated in FIG. 2. At least one of a starting or stopping instructions is received from the rotary control knob 12 by the controller 26 when the rotary control knob is actuated, such as by depression thereof. For example, pressing the knob 12 could now start the engine 24.

Next, a determination is made as to whether the engine 24 is on at S110. This can include an engine state signal being received by the controller 26 from the ECU 38 to indicate an ON and/or OFF state of the engine 24. The first indicia 18 are displayed on the display 16 whenever the ignition signal 42*a* indicates the presence of the ignition or portable device 40 at S106 and the engine state signal indicates that the engine is off at S110. Accordingly, only the first indicia 18 are displayed on the display 16 when the ignition signal 42*a* indicates the presence of the ignition of portable device 40 and the engine state signal from the ECU 38 indicates that the engine 24 is off. When the engine is ON, however, a determination is made as to whether the brakes are being applied in the vehicle at S112. In particular, the controller 26 can receive a brake switch signal 30*a*, which indicates an ON or OFF state of a brake of the vehicle.

When no determination is made in S112 that the brake is ON, the first indicia continue to be displayed at S102. However, when the brake is determined to be ON at S112, the second indicia 20 are displayed on the display 16 at S104. At this point, prior to rotation of the knob 12, the second indicia 20 displayed on the display 16 will correspond to a park position of the knob 12 in which the knob 12 commands through the controller 26 via signal 22*a* that the transmission 22 remain in a park gear. With the brake applied, rotation of the knob 12 is permitted at S114. This includes releasing the locking device 36 via signal 36*a*. The rotary control knob 12 can then be rotated through its various positions including: a park position corresponding to a park gear of the transmission 22, a reverse position corresponding to a reverse gear of the transmission 22, a neutral position corresponding to a neutral gear of the transmission 22 and a drive position corresponding to a drive gear of the transmission 22. When the rotary control knob 12 is moved to its various positions, an operation instruction is received by the controller 26 from the rotary control knob 12 based on the selected one of the plurality of positions at which the rotary control knob 12 resides. These various positions and the corresponding second indicia 20 are illustrated in FIGS. 3-6. As shown, the second indicia 20 displayed on the display 16 corresponds to the position in which the rotary control knob 12 resides. In addition, the second display area 50 illuminates a corresponding gear indication.

The second indicia remain displayed by the display 16 at least until the rotary control knob 12 is returned to the park position. Accordingly, a determination is made at S116 whether the rotary control knob 12 has returned to the park position. If no, the second indicia will continue to be displayed on the display 16. If yes at S116, a determination will be made again at S112 as to whether the brake is ON as determined by the brake switch 30. As long as the brake is ON at S112, the method proceeds to S104 wherein the second indicia 20 are displayed. If, however, the rotary control knob 12 is returned to the park position as determined at S116 and the brake is OFF as determined at S112, the first indicia 18 are again displayed at S102.

According to the foregoing, the second indicia 20 are displayed on the display 16 when the engine state signal as provided by the ECU 38 indicates that the engine 24 is ON and at least one of: the selected one of the plurality of positions for the rotary control knob 12 is a park position and the brake switch signal 30*a* indicates that the brake is ON; or the selected one of the plurality of positions is any other position than the park position (e.g., a reverse position, a neutral position or a drive position). The first indicia 18 are displayed on the display 16 when the selected one of the plurality of positions is the park position and the brake switch signal 30*a* indicates that the brake is off. As will be appreciated by those skilled in the art, only one of the first indicia 18 or the second indicia 20 is displayed on the display 16 at any given time, though this is not required.

Advantageously, the control knob assembly 10 depicted and described herein as a combination shifter and engine start apparatus 10 described herein has an appearance that is minimal, refined and advanced. Consolidating starting and stopping of the vehicle's engine 24 and the rotary control knob 12 has the advantage of providing a single integrated control that is intuitive. An added benefit is this apparatus frees up the space within the vehicle interior. The integration of these functions into a single control increases user efficiency, provides an intuitive control for two vehicle functions and frees up space within the vehicle interior.

It is to be appreciated that in connection with the particular exemplary embodiments presented herein, certain structural and/or functional features are described as being incorporated in defined elements and/or components. However, it is calculated that these features, to the same or similar benefit, also may likewise be incorporated in common elements and/or components or separated, where appropriate.

It is also to be appreciated that different aspects of the exemplary embodiments may be selectively employed as appropriate to achieve other alternative embodiments suited for the desired applications, the other alternate embodiments thereby realizing the respective advantages of the aspects incorporated herein. It is also to be appreciated that particular elements or components described herein may have their functionality suitably implemented via hardware, software, firmware, or in combination. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein are distinct from one another may be physically or functionally combined where appropriate.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A combination shifter and engine start apparatus for a vehicle, comprising:
   a control knob rotatable to a plurality of positions to instruct operation of an associated transmission of the vehicle and actuatable for at least one of starting and stopping of an associated engine of the vehicle;
   a display disposed on said control knob for alternately displaying first indicia on said control knob relating to at least one of starting and stopping of the associated engine and displaying second indicia on said control knob relating to a selected one of said plurality of positions; and
   a controller operatively connected to said control knob and to said display, said controller having a first mode wherein said controller commands said display to display said first indicia relating to said at least one of starting and stopping of the associated engine and a second mode wherein said controller commands said display to display said second indicia relating to said selected one of said plurality of positions.

2. The combination shifter and engine start apparatus of claim 1 wherein said control knob is displaceable as a button to actuate at least one of starting and stopping of the associated engine.

3. The combination shifter and engine start apparatus of claim 1 wherein said controller has a third mode wherein said controller commands said display to a non-display state.

4. The combination shifter and engine start apparatus of claim 1 wherein said controller is in said third mode until presence of a portable device corresponding to the vehicle is confirmed.

5. The combination shifter and engine start apparatus of claim 1 wherein said controller is prevented from entering said second mode when the associated engine is OFF.

6. The combination shifter and engine start apparatus of claim 1 further including:
   a brake switch operatively connected to said controller for indicating a status of an associated brake of the vehicle; and
   wherein, when a portable device corresponding to the vehicle is in a vicinity of the vehicle, said controller always in said first mode when the associated engine is OFF, or when both the associated engine is ON and said brake switch indicates that the associated brake is OFF; otherwise, said controller in said second mode.

7. The combination shifter and engine start apparatus of claim 6 wherein said controller is in a third mode wherein said controller commands said display to a non-display state when said portable device is outside said vicinity of said vehicle.

8. The combination shifter and engine start apparatus of claim 6 further including:
   a locking device that selectively prevents rotation of said control knob from a park position, which is one of said plurality of positions, to any other of said plurality of positions when the associated engine is ON unless said brake switch indicates that the associated brake is ON, said locking device operatively connected to said controller for control thereof.

9. The combination shifter and engine start apparatus of claim 1 wherein said display is an LCD display screen disposed on an upper surface of said control knob.

10. The combination shifter and engine start apparatus of claim 1 further including a second display disposed adjacent said control knob for displaying third indicia also relating to a selected one of said plurality of positions.

11. A control method for a combination shifter and engine operation apparatus in a vehicle, the control method comprising:
    providing a rotary control knob rotatable to a plurality of positions for instructing operation of a transmission of the vehicle and actuatable for at least one of starting and stopping of an engine of the vehicle, said control knob including a display disposed thereon;
    displaying first indicia on said display relating to at least one of starting and stopping of the engine; and
    displaying second indicia on said display relating to a selected one of said plurality of positions at which said rotary control knob resides.

12. The control method of claim 11 further including:
    receiving a ignition signal indicating presence of an ignition device; and
    receiving an engine state signal indicated an ON or OFF state of the engine,
    wherein said first indicia are displayed on said display when said ignition signal indicates said presence of said ignition device and said engine state signal indicates that the engine is OFF.

13. The control method of claim 12 wherein only said first indicia are displayed on said display when said ignition signal indicates said presence of said ignition device and said engine state signal indicates that said engine is OFF.

14. The control method of claim 13 further including:
    receiving a brake switch signal indicating an ON or OFF state of a brake of the vehicle, said second indicia are displayed on said display when said engine state signal indicates that said engine is ON and at least one of:
    said selected one of said plurality of positions is a park position and said brake switch signal indicates that said brake is ON; or
    said selected one of said plurality of positions is any other position.

15. The control method of claim 14 wherein said first indicia are displayed on said display when said selected one of said plurality of positions is said park position and said brake switch signal indicates that said brake is OFF.

16. The control method of claim 12 further including:
displaying neither said first indicia or said second indicia on said display except when said ignition signal indicates said presence of said ignition device.

17. The control method of claim 11 further including:
displaying only one of said first indicia and said second indicia on said display at any given time.

18. The control method of claim 11 further including:
receiving an operation instruction from said rotary control knob based on said selected one of said plurality of positions at which said rotary knob resides;
receiving at least one of a starting or stopping instruction from said rotary control knob when said rotary control knob is actuated by depression thereof.

19. The control method of claim 11 further including:
displaying said second indicia on a second display adjacent said rotary control knob.

20. A control knob assembly for a vehicle, comprising:
a rotary control knob rotatable to a plurality of positions for commanding a first vehicle function of the vehicle and separately actuatable through touch input on an upper face thereof for actuating a second vehicle function;
a display disposed on said upper face where said touch input is received for alternately displaying first indicia relating to said first vehicle function and second indicia relating to said second vehicle function;
wherein said first indicia displayed on said display relating to said first vehicle function without display of said second indicia; and
wherein said second indicia alternately displayed on said display relating to said second vehicle function without display of said first indicia.

21. The control knob assembly of claim 20 wherein said first vehicle function is operation of a transmission of the vehicle and said second vehicle function is at least one of starting or stopping of an engine of the vehicle.

* * * * *